(No Model.)  2 Sheets—Sheet 1.

W. CLARK.
PHOTOGRAPHIC CAMERA.

No. 361,672. Patented Apr. 26, 1887.

WITNESSES:
C. W. Benjamin
Geo. H. Donneborn

INVENTOR
Walter Clark
BY John R. Bennett
his ATTORNEY (No Model.) W. CLARK. 2 Sheets—Sheet 2.
PHOTOGRAPHIC CAMERA.

No. 361,672. Patented Apr. 26, 1887.

WITNESSES:
C. W. Benjamin
Geo. H. Sonneborn

INVENTOR
Walter Clark
BY John R. Bennett
his ATTORNEY

UNITED STATES PATENT OFFICE.

WALTER CLARK, OF NEW YORK, N. Y.

PHOTOGRAPHIC CAMERA.

SPECIFICATION forming part of Letters Patent No. 361,672, dated April 26, 1887.

Application filed October 26, 1886. Serial No. 217,220. (No model.)

*To all whom it may concern:*

Be it known that I, WALTER CLARK, a citizen of the United States, residing at New York, in the county and State of New York, have invented certain new and useful Improvements in Photographic Cameras, of which the following is a full and complete specification, reference being had to the accompanying drawings, forming a portion thereof.

The object of my invention is to improve and render more certain the action of the devices which produce the instantaneous effect in photographic cameras, and also to improve the devices for focusing.

My invention consists of a camera-box, preferably of the kind having the lens and its tubes within the box provided with a hinged lid which, when lifted, carries with it a ground-glass focusing-plate, which is maintained in a horizontal position by a certain arrangement of links, and is always at the same distance from the mirror upon which the incident rays are received that the said mirror is from the surface of the sensitive plate. The ground-glass plate is also provided with a hood so arranged as to fold within the box when the lid is lowered.

My invention further consists in placing within the camera-box a drum revolving upon a vertical axis under the action of an adjustable coiled spring, controlled by a friction-wheel, open for a portion of its cylindrical surface and provided in the closed portion with a window, for the admission of the light-rays when the window passes the aperture of the lens.

My invention further consists of certain details of construction of the various parts to render their action more certain and efficient and to insure the entire exclusion of light from the dark chamber.

These minor features will be more fully hereinafter set forth.

Figure 1:
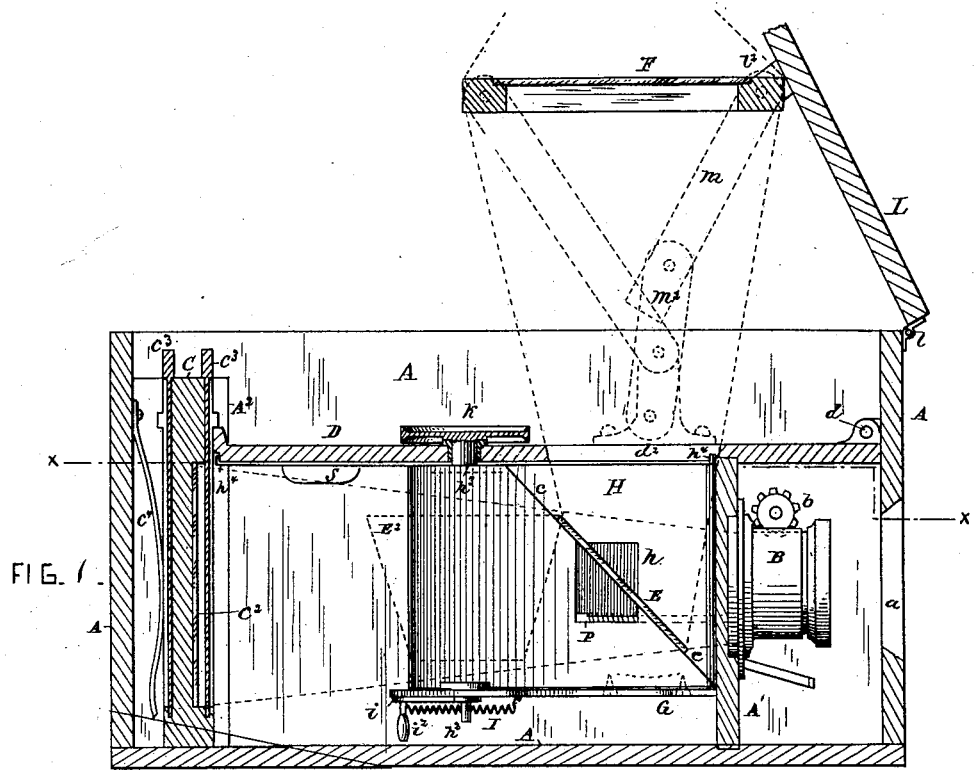
Figure 2:
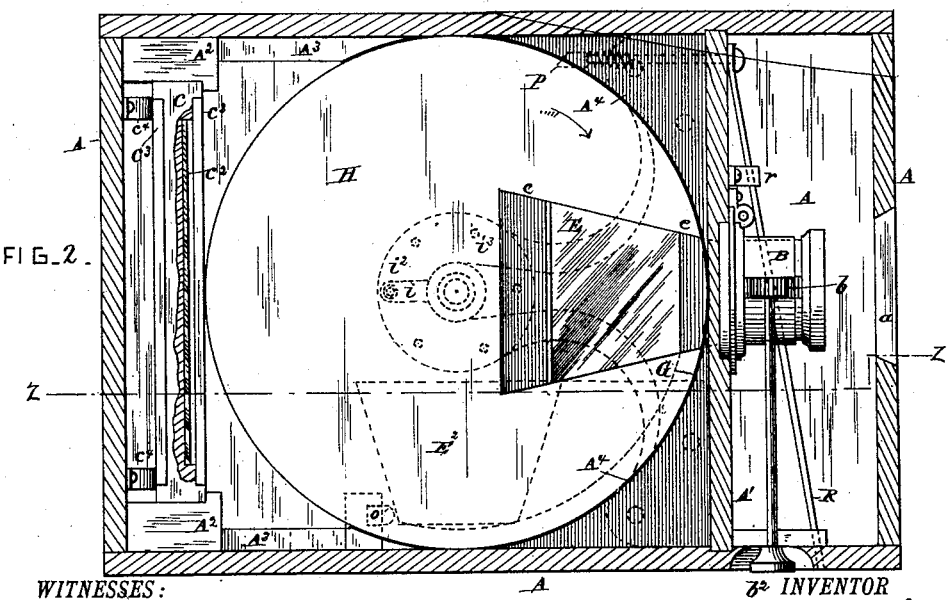
Figures 3, 4:
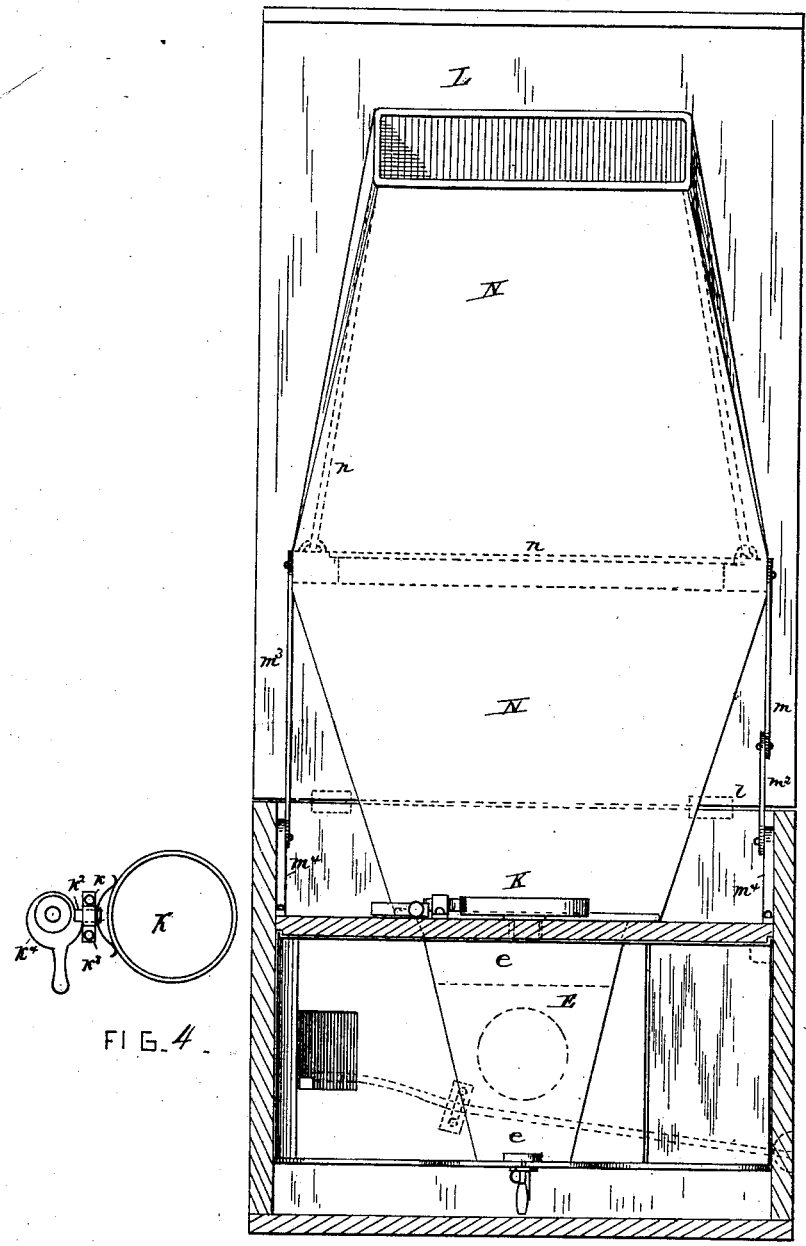

In the drawings, Figure 1 is a vertical section of the camera on the line $zz$ of Fig. 2. The lid is shown raised, a portion of the outer end of the lid being omitted. Fig. 2 is a horizontal section of the camera on the line $xx$ of Fig. 1. Fig. 3 is a cross-section of the camera on the line $yy$ of Fig. 2, showing in vertical projection the entire lid raised and the hood in working position. Fig. 4 is a plan view of the frictional device for controlling the motion of the revolving drum.

A is the camera-box, provided with the opening $a$, the partition $A'$, plate-holder guides $A^2$, slats $A^3$, and cheek-pieces $A^4$.

B is the lens-tube operated by the pinion $b$ and thumb-piece $b^2$.

C is the plate-holder; $c^2$, a sensitive plate; $c^3$, the front and back opaque slides; $c^4$, springs to keep the holder in place.

D is the internal lid hinged to the front of the box at $d$, and having the opening $d^2$, for light to pass from the mirror E to the ground-glass focusing-plate F. This lid D when down is held in place by certain projections on the plate-holder resting upon it. By removing the plate-holder the lid D can be turned upon its hinged end and raised for the removal of the drum H, which is pivoted to the lid D and to a support, G.

I is a clock-spring to rotate drum; K, a friction-wheel to control the rotation of the drum; $h$, a window in the drum; $m\ m^2$, links to support the lid L; $m^3$, a link, and $m^4$ a bar or support attached to the camera-box to support the outer end of the ground-glass plate F. These links are so contrived as to keep the plate always in a horizontal position when the lid L is raised.

N is an india-rubber hood mounted upon the folding wire frame $n$.

O is a buffer to stop the rotation of the drum H at the proper point; P, a catch to hold or release the drum, operated from the outside of the camera by the long rod R, passing through the support $r$.

The arrows indicate the direction of motion of the various parts.

Taking up the drum H in detail, it consists of a circular top having an opening in the proper place to permit the light to be reflected upward to the ground-glass plate, a bottom plate much cut away, its shape being indicated by outer curved dotted lines in Fig. 2, and a cylindrical plate extending around about one-third of the circumference of the drum and provided with an aperture, which I call a "window," large enough to permit of the passage of all the rays of light collected and transmitted by the lens. A second opening is made use of in focusing. This drum is mounted so as to revolve about a vertical axis, its bearings being below upon the plate G and above in the inner lid, D. A clock-spring, I, is attached at its inner end to the spindle $h^2$, which forms the lower journal of the drum, and at its outer end to a small spring crank and pin, $l^2$, which, by being caught in the various holes of G, places the clock-spring I under more or less tension. This spring causes the rotation of the drum H when the spring-catch P is withdrawn, by pressing upon the outer end of the rod R. To counterbalance the weight of the mirror a small weight, S, is added to the top of the drum.

The pivot $h^3$ at the top of the drum passes up through the lid D and has fixed upon it a smooth-rimmed wheel, K, against which a spring, $k$, Fig. 4, presses with more or less pressure, according to the position of the cam $K^4$, which is pivoted at $k^5$ to the lid D, and presses against the latch $k^2$, sliding in $k^3$.

The mirror, inclosed in a box open at the top, is secured in the drum at an angle of forty-five degrees opposite the opening for focusing, by means of the upper and lower supports, $c\ c$. When the window $h$ is opposite the lens it (the mirror) has turned away entirely out of the way of the beam of light. The flanges $h^4$, fitting into grooves in slide D, effectually prevent any leakage of light into the camera at the top.

The operation is as follows: The camera having been placed in position and directed at the object to be photographed, the lenses are thrown out, the cap removed, and the lid L raised until it is supported by the links $m\ m^2$. The ground-glass F is automatically brought into position and the hood distended. The drum is brought into such position that the reflecting-surface of the mirror is opposite the lens. Upon looking at the ground-glass plate the image of the object will be seen there exactly as it would be thrown upon the sensitive plate were the drum in proper position. When the lens has been adjusted so that the object is clearly defined upon the ground glass, the catch P is withdrawn by means of the lever or rod R, and the drum revolving in the direction of the arrow brings the window $h$ opposite the lens, and continues to revolve until it is brought to a stop by the buffer O, affixed to the side of the camera. During the instant that the window $h$ is passing by the lens the beam of light transmitted from the object is free to pass to the sensitive plate and act upon it, and is then immediately cut off by the further revolution of the drum, bringing the inclosed cylindrical surface between the lens and sensitive plate.

Should more force be required to rotate the drum, this can be obtained by winding up the clock-spring I by means of the spring-arm $i$ and pin $i^2$. This spring is retained at any required tension by the holes or notches $i^3$, into which the pin $i^2$ slips and is retained by the spring-arm $i$. To prevent the drum rotating too rapidly the spring K can be brought to bear more firmly against the wheel K by the cam $k^4$.

I claim—

1. A photographic camera provided with an inner lid, D, to which is pivoted a revolving drum containing the focusing-mirror, said inner lid being retained in place by a projection on the plate-holder, substantially as described, and for the purposes specified.

2. A photographic camera provided with a revolving drum mounted on a vertical axis and placed immediately behind the lens, said drum carrying the focusing-mirror, and provided with a window to admit the passage of light at the proper time through the lens to the sensitive plate, as herein described and shown.

3. In a photographic camera, the hinged lid L and ground-glass plate F, pivoted thereto and raised and supported by the links $m\ m^2\ m^3\ m^4$, the parts being so arranged and adjusted that when raised the plate F is always at the same distance from the focusing-mirror that the sensitive plate is from said mirror, as herein described and shown.

In testimony whereof I have hereunto set my hand.

WALTER CLARK.

Witnesses:
 GEO. H. SONNEBORN,
 W. E. STEARNS.